(12) United States Patent
Saldanha et al.

(10) Patent No.: US 9,916,589 B2
(45) Date of Patent: *Mar. 13, 2018

(54) ADVERTISEMENT SELECTION USING MULTIVARIATE BEHAVIORAL MODEL

(75) Inventors: Alexander Saldanha, Berkeley, CA (US); Mikhail Faiguenblat, Alameda, CA (US)

(73) Assignee: EXPONENTIAL INTERACTIVE, INC., Emeryville, CA (US)

( * ) Notice: Subject to any disclaimer, the term of this patent is extended or adjusted under 35 U.S.C. 154(b) by 73 days.

This patent is subject to a terminal disclaimer.

(21) Appl. No.: 13/416,778

(22) Filed: Mar. 9, 2012

(65) Prior Publication Data
US 2013/0238425 A1    Sep. 12, 2013

(51) Int. Cl.
*G06Q 30/00* (2012.01)
*G06Q 30/02* (2012.01)

(52) U.S. Cl.
CPC .................... *G06Q 30/02* (2013.01)

(58) Field of Classification Search
None
See application file for complete search history.

(56) References Cited

U.S. PATENT DOCUMENTS

| | | | | |
|---|---|---|---|---|
| 7,231,358 B2 * | 6/2007 | Singh | ................ | G06F 17/30864 705/14.46 |
| 2010/0088177 A1 * | 4/2010 | Lu | .......................... | G06Q 30/02 705/14.43 |

* cited by examiner

*Primary Examiner* — Richard Reinhardt
(74) *Attorney, Agent, or Firm* — Fenwick & West LLP

(57) ABSTRACT

An advertising system identifies behaviors from user activity and associates the behaviors with a user profile. Advertisers provide the advertising system with information on conversion rates of users associated with user profiles. A behavioral model of user responses is built to identify the relative frequency of behaviors for increasing the response rate of ads. Incoming advertising requests are matched to modeled behaviors to determine an advertiser's interest in bidding on the ad placement.

12 Claims, 6 Drawing Sheets

| Lift | Converters | Users | Cumulative Converters | Cumulative Users | Behavior ID | Behavior Name |
|---|---|---|---|---|---|---|
| 26.07 | 363 | 11438 | 363 | 11438 | 80176 | Topic: Activity Gear: Content |
| 23.19 | 2223 | 78734 | 2606 | 90172 | 536878218 | Domain: fitpregnancy.com |
| 21.95 | 1380 | 51628 | 4019 | 141800 | 80172 | Topic: Car Seats: Content |
| 16.04 | 363 | 18588 | 4403 | 160388 | 31517459 | Topic: Gift Registry: All |
| 15.68 | 1793 | 93948 | 6235 | 254336 | 31537489 | Topic: Toddler: All |
| 13.5 | 339 | 30664 | 6902 | 291908 | 8438626 | Topic: Hawaii: In-Market |
| 13.32 | 1376 | 84824 | 8315 | 376732 | 100046 | Topic: Diapers: Content |
| 12.87 | 397 | 25374 | 11014 | 540848 | 1073769504 | Site: Parenthood.com |
| 11.67 | 2306 | 162318 | 17754 | 897974 | 60042 | Topic: Cookbooks: Content |
| 10.85 | 814 | 61652 | 23349 | 1394094 | 1073747654 | Site: StorkNet.com |
| 10.11 | 963 | 78254 | 24349 | 1472348 | 1073767424 | Site: Pregnancy-Calendar.net |
| 9.75 | 951 | 80142 | 27265 | 1707076 | 12643156 | Topic: Getting Married: Search |
| 9.42 | 522 | 45502 | 27815 | 1752578 | 60169 | Topic: Wedding Showers: Content |
| 9.11 | 494 | 44624 | 28337 | 1797202 | 60232 | Topic: Scrapbooking: Content |
| 9.07 | 1619 | 146672 | 30003 | 1943874 | 1073743188 | Channel: All Sports.Golf |
| 9.01 | 1497 | 136448 | 31545 | 2080322 | 60278 | Topic: Picture Frames: Content |
| 8.59 | 987 | 94328 | 40020 | 2861076 | 50460 | Topic: Bed & Breakfast: Content |
| 8.12 | 658 | 66592 | 40710 | 2927668 | 12643260 | Topic: Birthday: Search |
| 8.12 | 452 | 45730 | 41189 | 2973398 | 6583 | Topic: Flashes: Content |
| 8.1 | 502 | 50932 | 41719 | 3024330 | 31517439 | Topic: Bridesmaid Dresses: All |
| 8.09 | 324 | 32898 | 42066 | 3057228 | 1073801664 | Site: Pregnancy-Period.com |
| ... | ... | ... | ... | ... | ... | ... |
| 2.53 | 502 | 163032 | 251531 | 41205672 | 31517307 | Topic: Desserts & Sweets: All |
| 2.44 | 1521 | 511173 | 253101 | 41716844 | 1.07E+09 | Site: StarTribune.com |
| 2.43 | 347 | 117123 | 253472 | 41833966 | 80151 | Topic: Women: Content |
| 2.4 | 1124 | 379968 | 254639 | 42213934 | 31463846 | Topic: Satellite: All |
| 2.24 | 10889 | 3732974 | 265649 | 45946908 | 1.07E+09 | Site: Cooks.com |
| 2.24 | 716 | 262652 | 267578 | 46744530 | 1.07E+09 | Site: Latest-Hairstyles.com |
| 2.2 | 560 | 205442 | 268563 | 46950032 | 60094 | Topic: Lighting: Content |
| 1.07 | 112187 | 41948616 | 381058 | 88898648 | 1.07E+09 | Channel: All.Internet.General |
| 1.07 | 343 | 263218 | 381426 | 89161866 | 60120 | Topic: Furniture: Content |
| 1.01 | 7687 | 6221558 | 389218 | 95383416 | 1.07E+09 | Site: NexTag.com |

| Multivariate User Behavioral Matrix | Behavior 1 | Behavior 2 | Behavior 3 | Behavior 4 | Behavior 5 | Behavior 6 | Behavior 7 | Behavior 8 | Behavior 9 | Behavior 10 | ... | Behavior N |
|---|---|---|---|---|---|---|---|---|---|---|---|---|
| User 1 |  |  |  |  |  |  |  |  |  | X |  |  |
| User 2 |  | X |  | X |  |  | X |  |  |  |  |  |
| User 3 | X |  |  |  |  |  |  |  |  | X |  | X |
| User 4 |  |  |  |  |  | X |  |  |  |  |  |  |
| User 5 | X |  | X |  |  |  |  | X |  | X |  |  |
| User 6 |  |  |  | X |  |  | X |  |  | X |  |  |
| User 7 | X |  |  |  |  |  | X |  |  |  |  |  |
| User 8 |  |  |  | X |  |  |  |  | X |  |  |  |
| ... |  |  |  |  |  |  |  |  |  |  |  |  |
| User N |  | X |  |  |  |  | X |  |  |  |  | X |

| Lift | Converters | Users | Cumulative Converters | Cumulative Users | Behavior ID | Behavior Name |
|---|---|---|---|---|---|---|
| 26.07 | 363 | 11438 | 363 | 11438 | 80176 | Topic: Activity Gear: Content |
| 23.19 | 2223 | 78734 | 2586 | 90172 | 536878218 | Domain: ftpregnancy.com |
| 21.95 | 1380 | 516628 | 4019 | 1418800 | 80172 | Topic: Car Seats: Content |
| 16.04 | 363 | 185888 | 4403 | 1603888 | 315174259 | Topic: Gift Registry: All |
| 15.68 | 1792 | 933948 | 6235 | 2543336 | 315374859 | Topic: Toddler: All |
| 13.5 | 339 | 206664 | 6902 | 2913908 | 8438626 | Topic: Hawaii: In-Market |
| 13.32 | 1376 | 84824 | 8315 | 3767332 | 100046 | Topic: Diapers: Content |
| 12.87 | 397 | 25374 | 11014 | 5408848 | 1073765504 | Site: Parenthood.com |
| 11.67 | 2306 | 162318 | 17754 | 9979974 | 60042 | Topic: Cookbooks: Content |
| 10.85 | 814 | 616652 | 23349 | 13940294 | 1073747654 | Site: StorkNet.com |
| 10.11 | 963 | 78254 | 24349 | 14723348 | 1073767424 | Site: Pregnancy-Calendar.net |
| 9.75 | 951 | 801142 | 27265 | 17070276 | 126431556 | Topic: Getting Married: Search |
| 9.42 | 522 | 455002 | 27815 | 17525578 | 60169 | Topic: Wedding Showers: Content |
| 9.11 | 494 | 44624 | 28337 | 17372022 | 60232 | Topic: Scrapbooking: Content |
| 9.07 | 1619 | 146672 | 30003 | 19438874 | 1073743188 | Channel: All.Sports.Golf |
| 9.01 | 1497 | 136448 | 31545 | 20803221 | 60270 | Topic: Picture Frames: Content |
| 8.59 | 987 | 94328 | 40020 | 28610576 | 50460 | Topic: Bed & Breakfast: Content |
| 8.12 | 658 | 66592 | 40710 | 29276668 | 126432260 | Topic: Birthday: Search |
| 8.12 | 452 | 45730 | 41189 | 29733939 | 6583 | Topic: Flashes: Content |
| 8.1 | 502 | 50932 | 41719 | 30243330 | 315174239 | Topic: Bridesmaid Dresses: All |
| 8.09 | 334 | 32898 | 42065 | 30577238 | 1073801664 | Site: Pregnancy-Period.com |
| ... | ... | ... | ... | ... | ... | ... |
| 2.53 | 502 | 163032 | 251531 | 412205672 | 315173787 | Topic: Desserts & Sweets: All |
| 2.44 | 1521 | 511172 | 253101 | 417716844 | 1.07E+09 | Site: StarTribune.com |
| 2.43 | 347 | 117122 | 253472 | 418339665 | 80151 | Topic: Women: Content |
| 2.4 | 1129 | 379968 | 254639 | 422133934 | 315463846 | Topic: Satellite: All |
| 2.24 | 108893 | 37329974 | 265649 | 459446908 | 1.07E+09 | Site: Cooks.com |
| 2.24 | 716 | 262652 | 267979 | 467445390 | 1.07E+09 | Site: Latest-Hairstyles.com |
| 2.2 | 560 | 205442 | 268569 | 469560032 | 60094 | Topic: Lighting: Content |
| 1.07 | 112187 | 41948616 | 331058 | 888998648 | 1.07E+09 | Channel: All.Internet.General |
| 1.07 | 343 | 263218 | 381426 | 891612866 | 60120 | Topic: Furniture: Content |
| 1.01 | 7887 | 6221550 | 389218 | 953383416 | 1.07E+09 | Site: NexTag.com |

ADVERTISEMENT SELECTION USING MULTIVARIATE BEHAVIORAL MODEL

BACKGROUND

1. Field of Art

The present disclosure generally relates to selecting advertising content for users of internet websites.

2. Background

Online digital advertising services are typically executed on separate systems from the services providing content to users. As users browse and access content at a content provider, the content provider accesses an advertising system to select and provide an advertisement to the user along with the content. The advertising system typically solicits advertising flights (i.e. advertising campaigns) from a plurality of advertisers. When the advertising system receives a request for an ad from a content provider, the advertising service selects an advertisement for the user from the active advertising flights and provides the advertisement to the user. For both advertisers and users, there is value in providing advertisements to users which are relevant to the user and which the user is likely to be interested in. Many advertising systems rely on information about the user's search query to determine the advertisement, without consideration of the user's historical behavior in regards to particular advertisements.

SUMMARY

An advertising selection system includes a system for developing and maintaining user profiles of client devices accessing advertising material. The user profiles are developed by maintaining information about user behaviors. These user behaviors can be derived from the content of the webpage the user is accessing, from a search query of the user, the use of a mobile application, purchases and other transactions performed online, activity on advertiser websites, and from third party informational services. In addition, user profiles are updated with information received from advertisers to determine the success rate, or "conversions" of a particular advertising campaign. Using the user profiles and the conversion information, the effect that specific behaviors have on conversion for individual advertisers is calculated relative to the average user. The ratio of a specific behavior's conversion relative to the average conversion is termed the lift of that behavior.

Using the behaviors and the conversion rates, a model for consumer conversions is built to calculate the cumulative lift of behaviors relative to the norm. The lift of each behavior and optionally sets of co-occurring behaviors ("behavior tuples") is calculated with respect to a population of users. The behavior tuple with the highest lift is identified, and the users identified by that behavior tuple are removed from the user population. The lift for the remaining behaviors is recalculated on the new population pool to determine the next behavior tuple providing the highest lift for the remaining population. In this way, the lift values for all behavior tuples are iteratively computed to identify a model indicating the lift provided by behavior tuples relative to the incremental population reached by the behavior tuples.

For each of the advertisers in the system, a behavioral model can be developed relative to user behaviors for any reference set of users (or baseline population). One such baseline population could be the set of users who have viewed that advertiser's advertisements in the past. Another baseline population may be all online users in the past 30 days. When the system receives a request for an advertisement from a particular user, the particular user's user profile is identified and the behaviors indicated by the user profile are accessed. The user's behaviors are compared to the behavioral models for each advertiser and used to identify the lift provided by this user's behavior for an advertisement shown by the advertiser. As such, each advertiser can identify the value of bidding to place an advertisement to this user using the user's behavioral model lift, the advertiser's average conversion rate and cost of conversions.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF DRAWINGS

FIG. 4 illustrates a multivariate user behavioral matrix which is used to construct an advertiser-specific behavioral model according to one embodiment.

FIG. 5 provides a table illustrating example lifts for a variety of behaviors relative to a particular advertiser according to one embodiment.

The figures depict embodiments of the present disclosure for purposes of illustration only. One skilled in the art will readily recognize from the following description that alternative embodiments of the structures and methods illustrated herein may be employed without departing from the principles of the disclosure described herein.

DETAILED DESCRIPTION

System Architecture Overview

Figure 1:
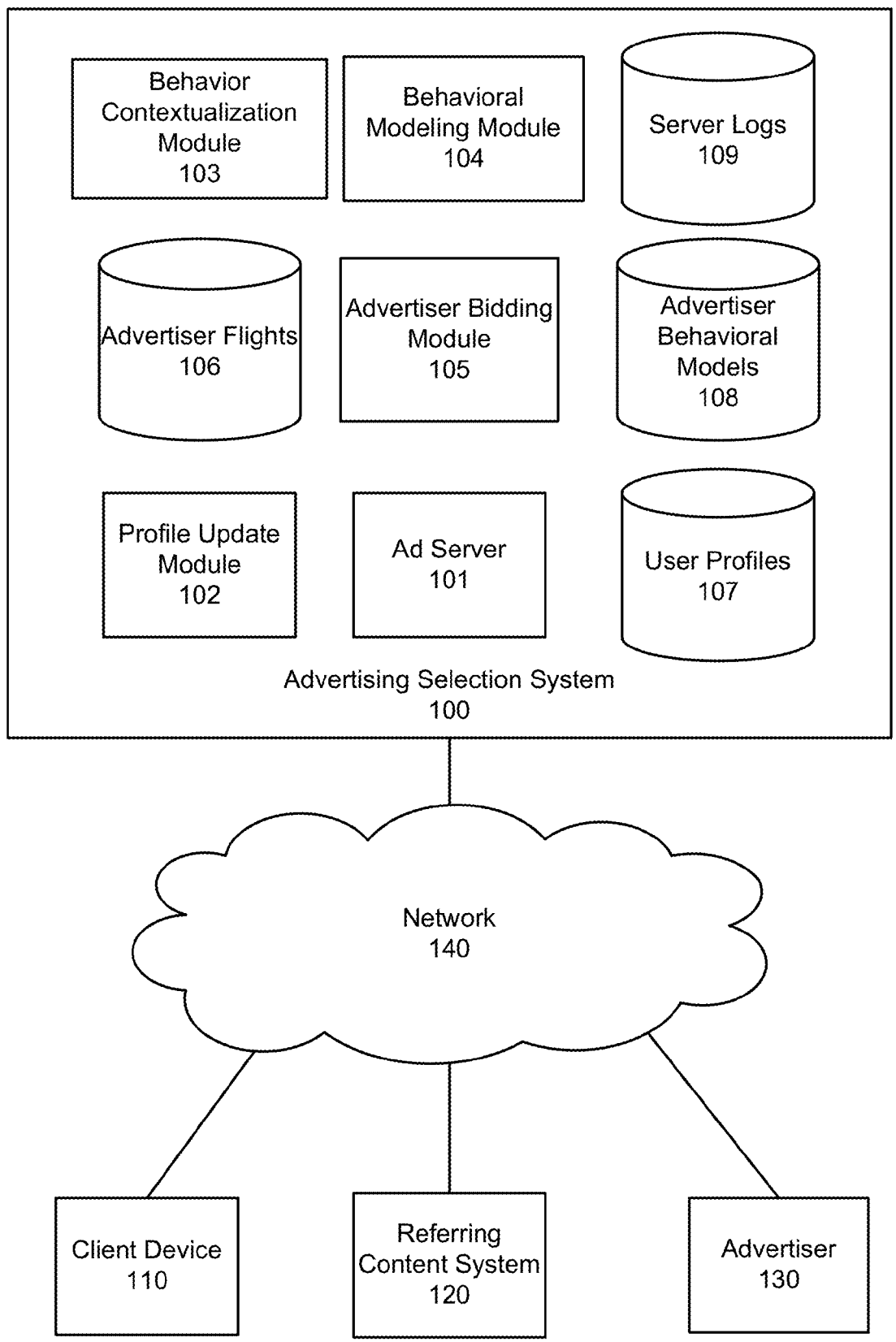
FIG. 1 is a block diagram of an advertising selection system for selecting and serving ads to a client device according to one embodiment.

FIG. 1 is a block diagram of an advertising selection system 100 for selecting and serving ads to a client device 110 according to one embodiment. A user of a client device 110 accesses a content system 120 to obtain content, such as web pages, movies, music, and so forth. The content system 120, when providing content to the client device 110 will also provide advertisements along with the content. The advertisements are selected by the advertising selection system 100. To select an advertisement, the content system 120 includes a reference or universal resource locator (URL) with the content it provides to the client device. Typically, the reference is located in an advertising portion of a content page, such as a side bar or a top banner.

The client device 110 resolves this reference which results in a request for an advertisement to the advertising selection system 100. The advertising selection system 100 identifies an advertisement to provide to the user and serves the ad to the client device 110. Note that in FIG. 1, for the sake of clarity only one instance of content system 120, client device 110, and advertising data service 130 is shown, though there could be any number of each.

The advertising selection system 100 additionally includes an ad server 101, a profile update module 102, an advertiser bidding module 105, a behavior contextualization module 103, a behavioral modeling module 104, and various databases supporting these modules and functions. These databases include an advertiser flights 106, user profiles 107, advertiser behavioral models 108, and server logs 109. Conventional features, such as firewalls, load balancers, authentication servers, application servers, failover servers, site management tools, and so forth are not shown so as to more clearly illustrate the features of the advertising selection system 100. In general, functions described in one embodiment as being performed by one component can also be performed by other components in other embodiments, or by a combination of components.

The advertising selection system 100 selects and provides advertisements to the client device 110. Though shown here as a single entity, the particular advertiser accessed by the client device is determined based on the ad provided by the advertising selection system 100 and the user actions. In addition, rather than the advertisement being provided by the advertising selection system 100, the advertiser 130 may provide the advertisement directly to the client device 110. For example, the advertising selection system 100 provides the user a reference to the advertiser 130 rather than directly providing the advertisement to the client device 110.

Client devices 110 are computing devices that execute client software, e.g., a web browser or built-in client application, to browse the internet and connect with content system 120 and advertising selection system 100 via a network 140 to access content and accompanying advertisements. The client device 110 might be, for example, a personal computer, a personal digital assistant, a cellular, mobile, or smart phone, a laptop computer, a television "set-top box," or any similar device capable of accessing content and advertisements over the a network 140. Client devices request content from the content system 120. The client devices 110 typically request information using hypertext transfer protocol (HTTP), though other access protocols can be used. The received content can include web pages based upon HTML, CSS, or Javascript, or other mark-up or scripting languages, and can also include video, audio, or other content types.

When the client device 110 requests an advertisement from the advertising selection system 100, it includes referrer link information to indicate to the advertising system 100 information about the referring content system and other context for the user's request. This information varies depending on the context of the advertising request. The information on a web browser may indicate the IP address of the browser making the request, or URL of the content source 120, or may include keywords from a search query. On a mobile device, the referrer link information may indicate the name of the application or other information about the context in which the user is operating. Mobile device applications may request permission from the user to identify the user's geographic location, which may be included in the referrer link information transmitted to the advertising selection system 100.

The client device 110 retains a persistent identifier for its communication with the advertising selection system 100. A persistent identifier can be any persistent information to identify the client device 110 to the advertising selection system. The persistent identifier is typically a browser cookie or other piece of data maintained by the client device 110, though other information can also be maintained. The client device 110 may use unique browser cookies for each browser used on the device or for different users logged into the system. In addition, persistent identifiers are typically not unique to individual persons, but rather machine, browser, and user-specific. For example, a user browsing on a home computer will have a persistent identifier on the home computer which is distinct from a persistent identifier from a work computer. The same user will also have separate persistent identifiers associated with each type of browser they are using on a single device. Two users on the same computer that log in with separate identities will also have separate persistent identifiers. In addition, users may delete persistent identifiers from the client device 110. This causes a new persistent identifier to be generated for the device despite that there has been no change in device or user. As such, each persistent identifier may only identify particular devices and particular sessions. Other persistent identifiers are used in different implementations. For convenience, a reference herein to a "user" from the perspective of the advertising selection system should be understood to refer to the persistent identifier unless clearly indicated that the "user" actually means the particular individual operating a client device, rather than the persistent identifier representing a cookie or other session-related identifier of the client device which is not relied on to identify specific users.

The persistent identifier in one embodiment also embeds associated behavioral information in the persistent identifier. The behavior information includes data about a set of behaviors associated with the persistent identifier. One type of behavior includes a topic from a behavioral vocabulary and an attribute of the persistent identifier related to the topic. These topics include concepts such as "software" or "children" or "politics." The attributes can indicate information such as whether a user is searching for the topic, reading information about the topic, in the market for the topic (interested in purchasing), and other behaviors related to the topic. The identified behaviors can be encapsulated in a browser cookie provided to the user and updated to indicate behaviors identified by the advertising selection system 100. In alternate embodiments, the persistent identifier includes only an identifier and does not include any further information about the user's behavior. In these embodiments, the persistent identifier is used by the advertising selection system 100 to locate the user profile located on the advertising selection system 100. The user profile contains all the data pertaining to the persistent identifier, including behavioral data.

The content system 120 can be any content source accessible by the client device 110. For example, the content system 120 may provide content pages using the technologies described above. The content can include news, video, informational pages, and various other types of information to the client device 110. Examples of content sources include social networks (e.g., FACEBOOK™), e-commerce sites (e.g., AMAZON™), news sites (e.g., CNN.com), blogs, user forums, video hosting services (e.g., YOUTUBE™, HULU™), audio hosting services (e.g., PANDORA™, SLACKER™) and so forth.

The network 140 provides a communications medium to enable correspondence between the advertising selection system 100, the client device 110, the content system 120, and the advertiser 130. The network 140 is typically the Internet, but may be any network, including but not limited to a LAN, a MAN, a WAN, a mobile wired or wireless network, a private network, or a virtual private network.

Advertising Selection System

The advertising selection system 100 includes various components and modules to enable the advertising selection system 100 to select advertisements for individual client devices 110. Using the persistent identifier maintained by the client device 110 (e.g. a browser cookie), the advertising selection system identifies advertisements to serve to the client device 110. The advertising selection system 100 also identifies user behaviors from referrer information, creates and updates user profiles, and builds behavioral models using the user profiles. These functions are performed by the modules and components within the advertising selection system 100. The system 100 may be implemented using a single computer, or a network of computers, including cloud-based computer implementations. The computers are preferably server class computers including one or more high-performance CPUs and 128 Gb or more of main memory, as well as 500 Gb to 2 Tb of computer readable, persistent storage, and running an operating system such as LINUX or variants thereof. The operations of the service 100 as described herein can be controlled through either hardware or through computer programs installed in computer storage and executed by the processors of such servers to perform the functions described herein. The service 100 includes other hardware elements necessary for the operations described here, including network interfaces and protocols, input devices for data entry, and output devices for display, printing, or other presentations of data. The functions and operations of the advertisement selection system 100 are sufficiently complex as to require implementation on a computer system, and cannot be performed simply by mental steps.

The ad server 101 is a module within the advertising selection system 100 for receiving ad requests from client devices 110 and providing an advertisement or direction to the client device 110 to receive an advertisement from an advertiser 130, and is one means for performing this function. The ad server 101 receives the ad request from the client device 110 together with a persistent identifier from the client device 110. The persistent identifier and referrer link information is received from the client device 110 and provided to the profile update module 102 and the advertiser bidding module 105. In embodiments where the persistent identifier received from the user device does not include behavioral information, behavioral information is retrieved from the user profiles 107. The profile update module 102 returns an updated user profile, and the advertiser bidding module 105 returns an advertisement to provide to the client device 110. The persistent identifier and the advertisement are provided to the client device 110. The persistent identifier includes the updated user profile in embodiments where the persistent identifier maintains behavioral information. In an embodiment where the persistent identifier does not encapsulate the user behaviors, the persistent identifier is returned to the user device 110 without updated behavioral information or a user profile. Information about the transaction, such as the served advertisement and persistent identifier are stored to server logs 109.

The profile update module 102 modifies and updates user profiles, and is one means for performing this function. The update to a profile can be performed on persistent identifiers received from a client device 110 which encapsulate behavioral information or may be performed based on user profiles retrieved from the user profiles 107 using the persistent identifier as the key to retrieve the user profiles. There are several sources of information to update a user profile which are detailed further with reference to FIG. 2. For example, one method of updating user profiles uses the referrer link information which is passed to the profile update module 102. The profile update module 102 requests an identification of the behavior represented by the referrer link information from the behavior contextualization module 104. After the behavior classified by the referrer link information is identified by the behavior contextualization module 104, the behavior is saved to the user profile. In one embodiment, the behavioral information is stored in user profiles 107 and is retrieved and updated using the persistent identifier. The updated information about the persistent identifier is provided to the ad server 101 for transmission to the client device 110 and may also be stored in the user profiles 107 and server logs 109.

The behavior contextualization module 103 identifies behaviors using referrer link information, such as a URL, and is one means for performing this function. The behavior contextualization module 103 receives the referrer link information from the profile update module 102 and provides the profile update module 102 with a behavior identified as reflected in the referrer link information. The behavior contextualization module 103 parses the referrer link information to determine, for example, whether the link information includes a search string or whether the link information indicates the user is reading a particular content page. This information is passed through a page analysis algorithm to determine the category of page content associated with the referrer link information. That is, the referrer link is used to determine the type of page the user is reading or the type of search performed by the user. For example, the category of page content may be "technology" or "routers" or "operating systems." For other information, such as an application being used by the user or the location of a mobile device, a behavior is identified relating to this information. The behavior contextualization module 103 identifies the category of behavior represented by the referrer link information and returns the identified behavior to the profile update module 102.

The behavioral modeling module 104 aggregates information in the user profiles 107 and server logs 109 to develop behavioral models, and is one means of performing this function. This behavioral model information is used to identify and save advertiser behavioral models 108. The behavioral modeling is performed by identifying user behaviors which provide improved likelihoods of advertising success. Advertisers 130 provide the advertising selection system 100 with information about the persistent identifiers of users who were responsive to the advertiser's message or product. This responsiveness is termed a "conversion." The implementation of a conversion may differ according to each advertiser. For example, certain advertisers treat the purchase of a product as a conversion, while other advertisers treat filling out an informational form a conversion, while another treats a conversion as a user who investigates an advertiser's content to a certain depth or for a certain length of time. In short, a conversion represents user interest in the advertiser's 130 advertisement. By using the advertiser 130's information about conversion and connecting the conversion information to particular user profiles 107, the behavioral modeling module 104 identifies which behaviors in user profiles are more likely to represent an opportunity for the advertiser to convert. As such, the behavioral modeling module 104 can create an advertiser behavioral model 108 for each advertiser which identifies which behaviors are associated with conversions for that particular advertiser, and the corresponding probabilities for these conversions. Though shown here as within the advertising selection system 100, the behavioral modeling module and the creation of an advertiser behavioral model in one embodiment are located on a physically separate system and updated models are provided to the advertising selection system 100.

The advertiser bidding module 105 selects an advertisement to provide to an individual request for an advertisement from the client device 110, and is one means for performing this function. The advertiser bidding module 105 receives a persistent identifier from the ad server 101 and identifies an advertisement based upon the behaviors associated with the persistent identifier, so as to maximize the value of a conversion by the user of the client device 110. To serve an ad, the advertiser bidding module 105 accesses advertiser flights 106 and advertiser behavioral models 108 to determine the advertisement to serve to the client device 110. The advertiser bidding module 105 accesses the behaviors associated with the persistent identifier. For active advertiser flights 106, the user's behaviors are matched against the advertiser behavioral models 108 to determine which advertiser has the highest expected conversion value for the user. The methods for selecting an advertisement for the user is further detailed below.

The advertiser flights 106 indicate the advertisers currently providing advertisements for the advertising selection system 100 to serve to client devices. The advertiser flights 106 provide information about the advertising campaign by an advertiser. For example, the advertiser flights 106 typically include a total budget for the advertising flight, the time frame for the advertisements, the average value of a conversion, the average conversion ratio, particular advertising content (e.g., a list of advertisements to be selected from for this advertiser's particular campaign), and other information about the advertising flight. The advertiser flights 106 are provided by advertisers through an interface to the advertiser (not shown) or can be entered by an operator of the advertising selection system 100, for example by a sales manager.

User Profiles

Figure 2:
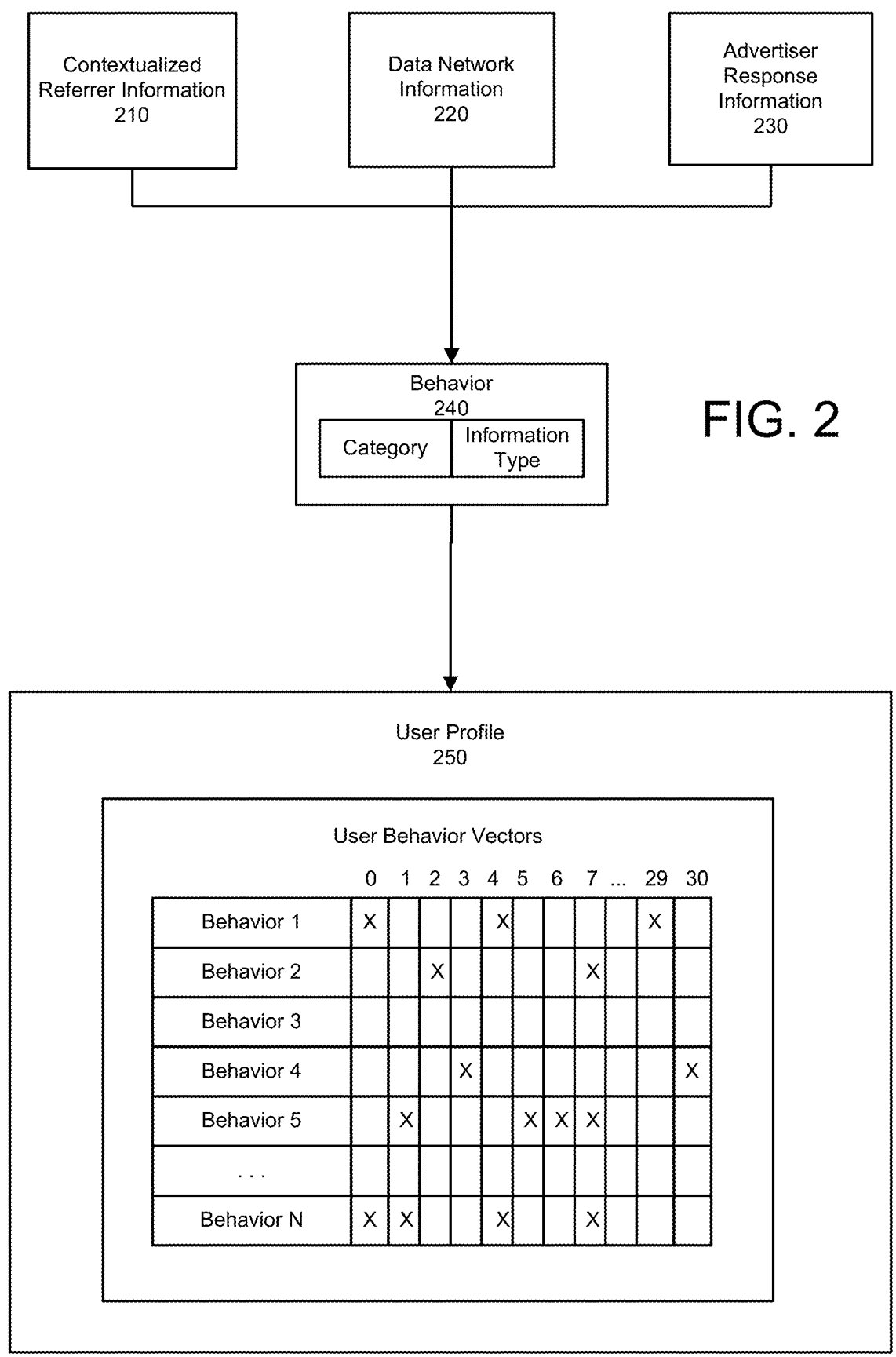
FIG. 2 shows a conceptual diagram of the behaviors in a user profile according to one embodiment.

Referring now to FIG. 2, a conceptual diagram of the behaviors in a user profile 250 is shown according to one embodiment. The user profile 250 includes various information about the user, such as the user's persistent identifier, any demographic information known about the user, the user's geographic area, the timestamp of last update, and other information. The geographic information about a user can typically be derived from the user's IP addresses, though geographic information obtained from a user IP address may not be reliable due to the possibility the user is accessing the advertising selection system 100 through a proxy or other intermediary. Geographic information may also be provided by a mobile device. Information stored in the user profile typically does not include personally identifiable information. Since the system as a whole identifies aggregates information across many user profiles, personally identifying information is not necessary to identify behaviors which affect a user's likely behaviors. However, some embodiments may include certain personally identifiable information in user profiles.

The user profile 250 in one embodiment also includes user behavior vectors. The user profile 250 is updated by the profile update module 102. The profile update module 102 can receive information to update the user profile 250 from a variety of sources. In this embodiment, the sources for updating the user profile 250 include contextualized referrer information 210, advertising network information 220, and advertiser response information 230. These sources of information are converted into a behavior 240 which represents a semantic category and an associated information type. The semantic categories are organized into a hierarchy of categories to form a category vocabulary or taxonomy. The information type indicates an aspect of the behavior associated with the category. Information types include "search," whereby the user is searching generally for information about the category; "in market," in which the user is interested in making a purchase for a good or services related to the category; "converted," in which the user is obtaining information specific to advertiser providing products or services in that category. In one embodiment, there are over 12,000 categories and the total number of behaviors (category×information type) in a user profile is around 50,000.

The data network information 220 is information received from other data networks by the advertising selection system 100. This information may vary in the types of information provided by the data network information 220. For example, the data network information may provide a topical language hierarchy which differs from the language vocabulary used by the advertising selection system 100. In that event, the profile update module 102 translates the data network information vocabulary to the language vocabulary used by the advertising selection system 100. The translation of the language vocabulary is accomplished by accessing a look up table in one embodiment. The look up table is manually entered by operators of the advertising selection system. In an alternative, the translation of one vocabulary to another may be performed, for example, by an automated process using a thesaurus or word clusters. In addition, data network information 220 may include additional information, such as an indication that a user is "in market" for a product.

The advertiser response information 230 is provided by an advertiser 130 and provides a feedback mechanism for the system to identify which users were actually converted by the advertiser 130. The conversion of the user can be lodged as a behavior 240. In addition, the advertiser response information 230 may include information from the conversion about the user's demographics, which can additionally be stored in the user profile 250.

The user profile 250 also includes user behavior vectors. The user behavior vectors include information indicating whether the user has engaged in behaviors. In one embodiment, the user behavior vector is updated to indicate whether the user exhibited a behavior associated with the user behavior vector on a particular day. For example, multiple accesses by the user to a particular website on a given day may be recorded only once to indicate the user engaged in that behavior on that day. The user behavior vectors can store information for each behavior vector for a look back period of some number of days. Shown in this figure is a look back period of thirty days. For example, Behavior 1 was engaged in on days 0, 4, and 29 as shown (i.e., "0" being the current date, "4" being four days in the past, and "29" being twenty-nine days in the past). The timestamp in the user profile information 250 can be used to update the user behaviors and age the behaviors engaged in by the user. For example, if the user has not accessed the advertising selection system 100 in the past three days and accesses the system today, the system will update the user behavior vectors by shifting the behaviors back three days and adding today's behavior to day 0. As such, each user profile includes a lookback period to identify behaviors engaged in by the user over time. The user profile 250 is stored with user profiles 107, and may also be written to the server logs 109 periodically, such as at the end of each day, or the first time the user is seen each day when the user profile in one embodiment is stored with the client device.

Behavioral Contextualization

Figure 3A:
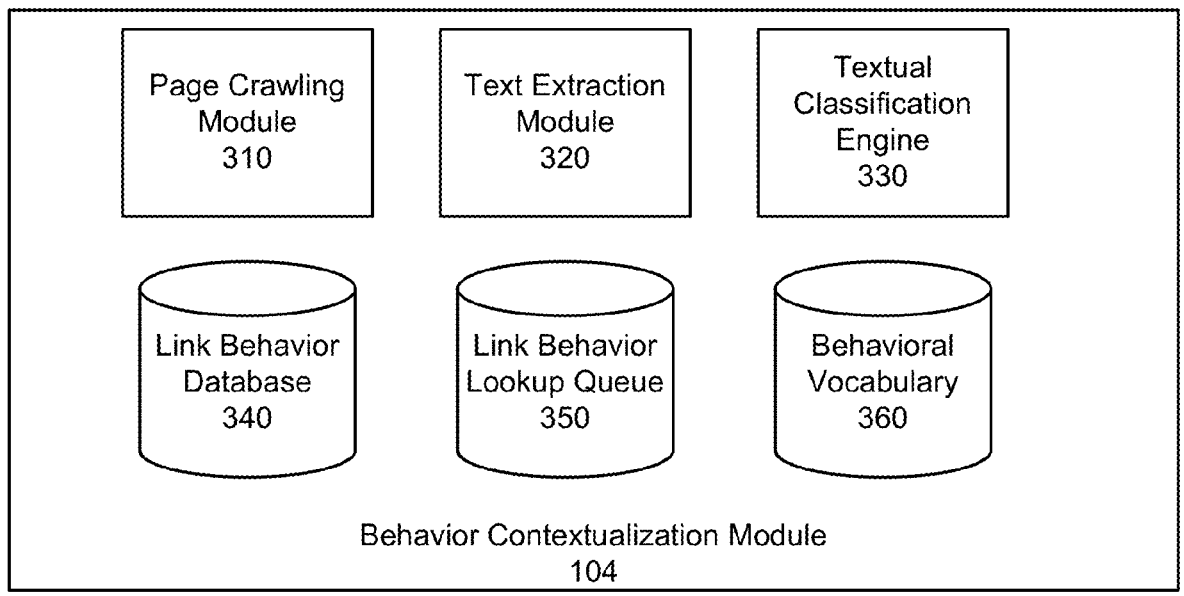
FIG. 3A illustrates the components of the behavior contextualization module according to one embodiment.

FIG. 3A illustrates the components of the behavior contextualization module 104 according to one embodiment. The behavior contextualization module 104 determines a behavior from the referrer link information for use with the user profile matrix. That is, the behavior contextualization module receives information about the referrer link such as the address the user was accessing or the search string used to conduct a search on the content system 120. The behavior contextualization module 103 includes a page crawling module 310, a text extraction module 320, and a textual classification engine 330. The behavior contextualization module 103 also includes a link behavior database 340, a link behavior lookup queue 350, and a behavioral vocabulary 360.

The page crawling module 310 is used to access web content using the referrer link and obtaining information from the referrer. For example, the page crawling module 310 may download the textual contents of the page and from other pages on the target domain. Using the textual information, the text extraction module 320 identifies the portions of the referrer-linked page which are relevant to determining the category of the referrer page. Initially, the referrer page is compared with other pages in the domain in order to strip information from the referrer page which is not unique to the referrer page. For example, many web pages share various control and user interface elements which are common across the domain, and fail to provide any meaningful identification of the type of content on the website. Next, the text extraction module 320 identifies the paragraphs and sentences of a page, and performs morphological analysis to stem words to a root. Using the stemmed words, the textual classification engine 330 identifies the topic pertaining to the words on the page.

Figure 3B:
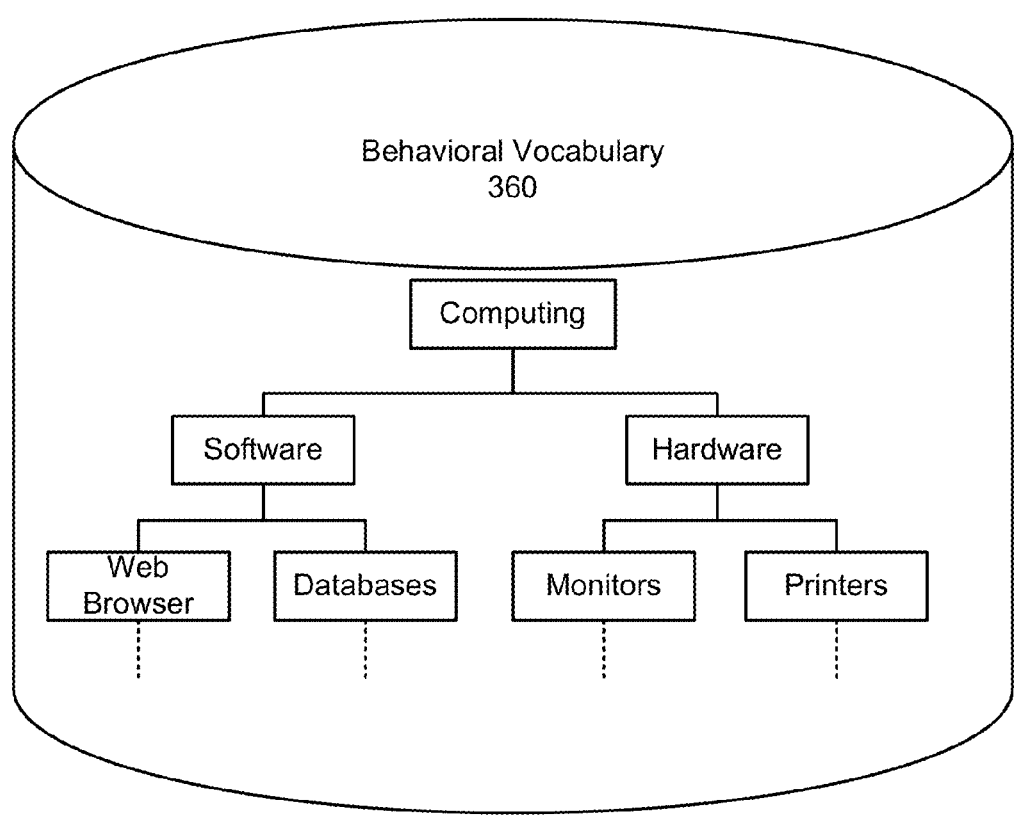
FIG. 3B shows a sample behavioral vocabulary according to one embodiment.

The textual classification engine 330 accesses the behavioral vocabulary 360 to determine which topics are represented by the stemmed words. A sample behavioral vocabulary 360 is shown in FIG. 3B. The behavioral vocabulary is organized hierarchically, for example, by providing a web browser as a subcategory of software as a subcategory of computing. Each topic in the behavioral vocabulary is associated with a plurality of tuples identifying stemmed words associated with the topic in the behavioral vocabulary. For example, a "database" topic may include the tuple [sql, access, query], while a tuple for the topic "printer" may include [laser, color].

The textual classification engine 330 uses the stemmed words and the tuples in the behavioral vocabulary 360 to identify the most prominent topics in the referrer link information. For each stemmed word in the page, each tuple in the behavioral vocabulary 360 containing that word is identified. Next, the remaining words in the identified tuple are checked to determine if the other stemmed words on the referrer link match the remaining words in the tuple. As a result, for each page, each tuple is identified in the behavioral vocabulary 360 for which all elements of the tuple appear on the page. Each tuple is used to increment a count for that topic within the behavioral vocabulary 360. Next, the textual classification engine 330 builds up from the lowest level of topics to identify the topic with the highest count. This highest-count topic is identified as the behavior for the referrer link. The behavior for the referrer link is now provided to the requesting module and can be indicated as a behavior associated with the user. In addition, the behavior for the referrer link is stored in the link behavior database 340.

The link behavior database 340 maintains a set of referrer links associated with particular behaviors. As the behavior contextualization module determines the behaviors for a particular link, the link behavior database 340 records the associated behavior for the link. For example, a particular content page may be determined to include information about "technology," and the link behavior database 340 is used to provide a behavior for the page rather than collecting text from the page using the page crawling module 310.

In addition, to manage the rate of accessing external content, the referrer links are added to a link behavior lookup queue 350 rather than immediately accessed. The link behavior lookup queue maintains a record of the requested referrer links. The referrer links can be removed from the queue as links are processed and behaviors are identified. Though described as a queue, the link behavior lookup queue 350 may have its members re-ordered according to a priority for determining link behaviors. For example, the link behavior lookup queue 350 may record the number of requests for a particular referrer link and use the number of requests to prioritize frequently requested referrer links prior to determining behaviors for infrequently requested referrer links.

In some instances, rather than identify the address of the page (i.e. URL) for a referrer link, the referrer link from the user includes a search query. Rather than access the content pages for the referrer links, a contextual analysis using the textual classification engine 330 and the behavioral vocabulary 360 is performed on the search string to identify topics which the user was searching for.

Alternate embodiments identify behaviors from the referrer link in a variety of ways. Any method of identifying behaviors from user accesses may be used and the resulting behavior is translated into a behavior represented within the advertising selection system vocabulary. For example the referring link may provide a behavioral context for the referring content and obviate the need to access the content of the referring link.

Multivariate User Behavioral Matrix

Using the user profiles and behaviors identified with users, a model is built for each advertiser using the behavioral modeling module 104 to identify the user behaviors indicative of a likelihood of increased conversion rates for that advertiser. These models can be identified on a per-advertiser basis, because each advertiser can provide information about the specific users who converted with the advertiser. FIG. 4 illustrates a multivariate user behavioral matrix which is used to construct an advertiser-specific behavioral model.

The behavioral model is used to determine a value referred to as "lift," which indicates the likelihood a user with a particular behavior will convert relative to an average user. Formally, lift $L_i$ for a behavior $B_i$ is the probability $P$ of a target behavior $T$ given the behavior $B_i$ divided by the probability of the target behavior over the whole population. This is shown in Eq. 1:

$$L_i = P(T|B_i)/P(T) \quad \quad \text{Eq. 1}$$

Equivalently, the lift can also be given by:

$$L_i = P(T \& B_i)/[P(B_i)*P(T)] \quad \quad \text{Eq. 2}$$

As a result, the lift provides a numerical method for quickly identifying the increased likelihood of the target behavior (typically conversion) given the particular user behavior. For example, the average lift is 1.0. As such, a lift of 3.0 indicates that for a given behavior $B_i$, the user with behavior $B_i$ is three times as likely to do T as the average user.

In FIG. 4, assume behavior 1 represents the target behavior, such as converting to the target advertiser. For example, considering only users 1-8 and behaviors 1-10, to calculate the lift of behavior 10 with respect to behavior 1, the probability of behavior 1 given behavior 10 is calculated, which is two users of four, or 0.5. Next, this probability is divided by the fraction of users of the whole who exhibit the target behavior (behavior 1), which is three of eight users, or 0.375. The lift of behavior 10 for the target behavior 1 is therefore 0.5/0.375, or 1.333.

In order to calculate the lift, the parameters for determining the behaviors for users is constructed using the multivariate user behavioral matrix as shown in FIG. 4. The multivariate user behavioral matrix provides a matrix to indicate whether a user has performed particular behaviors within a time frame. The particular time frame can be selected by the system operator. For example, the user profile 250 includes a look back period of 30 days. If the behavior has occurred for the user any time within the look back period, the user is indicated to have exhibited the behavior in the multivariate user behavioral matrix. In addition, the system operator can also select a period of days to review in the system logs. For example, the modeler may review user profiles for a period of the past thirty days, and indicate the user exhibited the behavior if the user exhibited the behavior at any point in a user profile for those thirty days. User profiles are written to the logs in this embodiment if the user has logged in that day. Since the user profile has a look back period, by capturing thirty days of user profile information, each of which captures thirty days of look back period, the system can capture if the user has logged in the past thirty days, and if so, can look back up to 60 days to determine if the user exhibited the behavior. These parameters can be adjusted according to the design of the system to use various delay periods.

In addition to the single behaviors indicated above with respect to the user profiles, the multivariate user behavioral matrix can also incorporate entries with multiple behaviors. For example, combinations of two or three behaviors can be identified to further identify the behaviors tending to create the target behavior. That is, the combination behavior $B_n$ is the intersection of $B_i$ and $B_j$: $B_n=(B_i\ \&\ B_j)$. As a result, the number of behaviors in the multivariate user behavioral matrix can scale quickly.

The number of users in the multivariate user behavioral matrix is not limited and can encompass all user profiles in the system. For example, in one embodiment the number of user profiles exceeds 600M. In order to reduce the processing time required to determine the lift for each behavior, the system can determine lift behaviors using a sampled portion of in-behavior and out-behavior users. Since the ratio of out-behavior users is typically significantly higher than in-behavior users, the selection of a sampled group of users for in-behavior can be at a higher ratio than for out-behavior groups. For example, one of every four in-behavior users can be sampled while sampling one in every ten out-behavior user. The lift can be determined based on this sampled group of users and adjusted for the sampling ratios. Since the population is sampled for each behavior in order to determine the lift, a one-sided confidence interval is calculated to determine a 90% confidence floor on the lift value.

Lift Curve

Using the techniques above provide a confidence floor for the lift of each behavior in the multivariate user behavioral matrix. This matrix provides the lift of each behavior independent of other behaviors. FIG. 5 provides a table for the lift of each behavior dependent on the behaviors which have been selected prior to the examined behavior. That is, each behavior's lift is determined by excluding the users who have already been included in the lift of a prior behavior. Described another way, if behavior $B_i$ is selected prior to $B_j$, the intersection of users who exhibit both $B_i$ and $B_j$ are excluded from consideration in the lift for $B_j$. In this way, each user is only counted once in the in-group calculation of the lift for the target behavior. Using FIG. 4 as an example with target behavior 1, after determining the lift of behavior 10, users 3 and 5, who each exhibited behavior 10, would not be considered in future calculations of the lift for behaviors 2-9.

In order to calculate this cumulative lift, the lift for each behavior is iteratively calculated, by excluding on each iteration the users who contributed to lift in the past iteration. For example, in iteration 1, no users are excluded, and the lift for each behavior is calculated. Next, a behavior which provides the maximum lift is determined, $B_{max}$. Next, the lift for the remaining behaviors is recalculated, by excluding the users from each behavior the members of $B_{max}$. The results of this iterative approach are shown in FIG. 5. In this way, a sequence of behaviors is iteratively selected, where each subsequent behavior identifies behaviors which have not previously been targeted by a behavior in the sequence.

The recalculation of the lift for behaviors can be performed by several methods. For example, the system may recalculate the lift by identifying the other behaviors which are affected by the selected behavior and updating only those behaviors to exclude the users who are targeted by the selected behavior. Alternatively, the system may re-calculate the lift for every behavior.

Though described above as an iterative selection of behaviors providing the maximum lift, actual system operation may not actually select the "maximum" for each selection of behaviors. For example, in order to speed processing time, a group of behaviors may be selected for the sequence of behaviors rather than individually. After recalculating, another behavior may provide higher lift than one of the previously selected behaviors. As such, depending on the method for selecting behaviors, while the lift curve generally indicates a maximum lift for the first behavior and decreasing lift for subsequent behaviors, it is not a requirement of the lift model.

FIG. 5 shows the cumulative lift of behaviors for a target behavior relating to conversion for an advertiser of pregnancy fitness clothing. The series of behaviors organized by lift is referred to as a "lift curve" which is represented here in table form. The number of "cumulative converters" indicates the number of converters who converted using any of the prior behaviors, while "converters" indicates the number of new users who exhibited that line's behavior without exhibiting any of the prior behaviors associated with the conversion. By identifying the lift of each behavior and recalculating the lift for each new behavior, this advertising model allows an identification of each target population which provides the next-best likelihood of converting with the advertiser. In addition, this allows the system to quantify overlap between groups of behaviors and avoid targeting similar groups where users of one behavior are already targeted by a prior rule.

Figure 6:
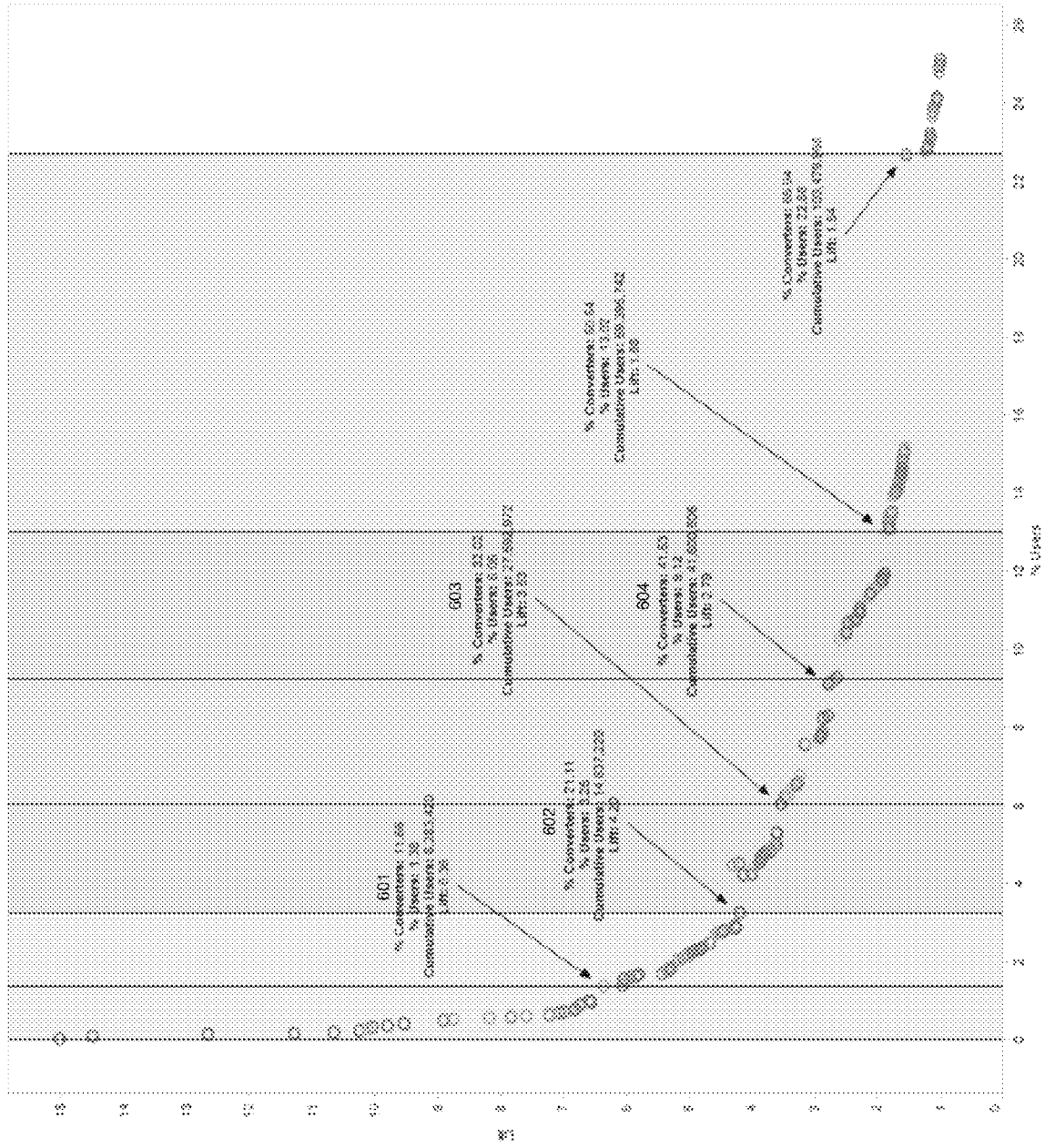
FIG. 6 illustrates a lift curve graphically according to one embodiment.

Behaviors comprising the lift curve are described with respect to FIGS. 5 and 6 as individual behaviors. However, behavior tuples are also used in embodiments to more precisely identify groups of users. That is, the behavior tuples identify users who jointly exhibit behaviors belonging to the tuple. The number of behaviors in a behavior tuple can be selected according to the implementation, and multiple sizes of behavioral tuple may be used in the same implementation. For example, one embodiment includes a tuple of two user behaviors, a tuple of singleton behaviors, and a null behavior tuple. The null tuple { } is used to identify characteristics of users who have not exhibited any characteristics of other selected tuples. The behaviors selected for each tuple are selected in a variety of ways according to the implementation. Tuples can be selected using the lift of individual behaviors (e.g. behaviors with lift >1), or the tuples can comprise n-gram tuples for all combinations of behaviors (e.g. every pair of behaviors).

FIG. 6 illustrates a lift curve graphically according to one embodiment. This figure indicates the lift achieved by each individual behavior indicated by a circle on the graph. The y-axis indicates the lift provided by each behavior. The x-axis indicates the cumulative percentage of users who are selected by the behavior and all previous behaviors on the left curve. That is, the behavior at point 604 reflects a cumulative percentage of users including those captured by each behavior towards the x-axis on the graph, such as behaviors at points 601, 602, and 603. The behavior at point 602 reflects a cumulative percentage of users indicating those captured, for example by the behavior at point 601, but not the users to its right, such as 603 or 604. As indicated by annotations on FIG. 6, each behavior is associated with the cumulative percentage of converters, the cumulative number of users, and the lift of the particular behavior.

In addition to the lift curve provided above, additional curves can be calculated, alone or in combination with the lift curve. For example, curves can be calculated using similar techniques to measure behaviors with high co-occurrence, and identify other metrics such as the size of a user population reached by a behavior, frequency of occurrence, stability of occurrence in the population, and other measures. These additional curves can also be combined with the lift curve for an advertiser. For example, the lift curve of an advertiser may be modified with the stability of the behavior over time.

Advertising Flight Selection

The advertiser bidding module 105 uses the lift curves to inform advertiser bidding values and select an advertiser to provide to a user. In particular, advertiser bidding module 105 identifies the advertiser who will obtain the highest expected benefit from providing the ad by identifying the expected benefit to each advertiser of serving an advertisement to individual users. Stored in the advertising flights 106 is information about the average conversion rate and the value of a conversion (or value per lead). The average conversion rate is determined by feedback from each advertiser and or can be estimated when the advertiser initiates an advertising flight. Where an estimation is initially provided, it can be revised as the ad flight is initiated using real conversion rates from provided ads. The value of a conversion is also provided by the advertiser and may vary, for example by the nature of a conversion. For example a user purchase may provide a conversion value based on the average purchase price, while a user providing information may be valued according to the value of that information and estimated purchases when a salesman follows up on that information.

The conversion rate together with the conversion value allows a fair comparison across multiple advertisers to determine the value of a customer to each advertiser. For example an advertiser with a high conversion rate but low value can be compared with an advertiser with a lower conversion rate but high value to determine which advertiser expects to earn, on average, more from an ad placement. The per-advertiser expected value for a conversion is calculated by multiplying the conversion rate with the conversion value. This expected value is termed the advertiser's eCPM or eCPM(advertiser).

When a request for an advertisement is received by the advertising bidding module 105, the advertising bidding module first identifies a group of candidates advertisers interested in bidding on providing an ad to this user. Each advertiser may provide restrictions about the advertising flight, such as target demographics or a target geographical area. These restrictions narrow the eligible users who may be served an ad. Stated from the perspective of providing an ad to an individual user, these restrictions narrow the eligible advertisers who are willing to bid on the ad.

After identifying candidate advertisers, the system next identifies the value to each advertiser of placing an ad to this user. The user profile is matched with each advertiser's lift curve to determine the behavior tuple in the user profile which yields the highest lift (and therefore conversion rate) for this advertiser. The highest lift for each advertiser is multiplied by that advertiser's eCPM to determine the value of this particular user to each advertiser, which is the eCPM (advertiser, user). This is possible because the user's profile information is used to individually identify user behaviors predictive of the user's conversion rate relative to the average.

In an alternate embodiment, rather than multiply the lift by the eCPM, the system multiplies the conversion rate of behavior tuple by the value per lead. The eCPM typically represents a long-term cost to the advertiser of placing advertisements, while the value per lead indicates the revenue gain of a conversion for this particular lead. In various embodiments, either value may be used to identify an individualized value of the user relative to the advertiser.

Using these values to each advertiser of providing an ad to this user, eCPM(advertiser, user), the system can find the advertiser with the highest expected return. As a general rule, the highest eCPM(advertiser, user) will bid and win the advertisement slot.

However, depending on an advertiser flight, the advertiser may choose not to bid on a particular user. For example, the advertiser flight may also include a budget and a pacing rate. A pacing rate indicates an expected rate of expenditure on advertising such as $1,000 per day. As such, an advertiser may decline to bid, for example, if the advertiser is ahead of schedule, or increase bidding if the advertiser is behind schedule. The advertiser spending can be determined to be ahead or behind schedule on various update cycles, such as daily, hourly, or continuous basis. Each advertiser tracks its pacing, eCPM, and impressions to determine whether to bid. The system aims to achieve close to 100% pace for each advertising flight while selecting only the most valuable users to bid on. The most valuable users are determined by the users with the highest lift for that advertiser.

The lift curve can be used to adjust the actual spending rate of the advertising flight. For example, a threshold for choosing a behavior with a minimum lift can be chosen. In FIG. 5, for example, a minimum lift of 9 can be chosen, and any user with a behavior corresponding to a lift higher than 9 is bid on by the advertiser. This minimum lift can be chosen by setting the value directly, or identifying a specific behavior and using the lift associated with that behavior. The minimum lift is also automatically adjusted according to the actual spending of the campaign. For example, if the actual spending of the campaign is behind the pacing schedule, indicating the advertising flight is not spending aggressively enough, the minimum lift value is decreased to bid on an increased number of ad requests (which usually implies an increased pool of users that make these ad requests). Likewise, if the actual spending of the campaign is ahead of schedule, the minimum lift value is increased to reduce the actual rate of spending.

In an alternate implementation, rather than adjusting the lift threshold to determine the bid value, the threshold is used for the eCPM calculated using the lift value. Similar logic can be used to adjust the eCPM to maintain advertiser pacing.

In addition to increasing or decreasing the rate of spending based on the spending pace, the spending pace can also be manipulated by adjusting pacing calculation. For example, the calculation can be based on a timeframe ahead of the actual timeframe in order to ensure the budget is spent by the deadline.

SUMMARY

The present disclosure has been described in particular detail with respect to one possible embodiment. Those of skill in the art will appreciate that the disclosure may be practiced in other embodiments. First, the particular naming of the components and variables, capitalization of terms, the attributes, data structures, or any other programming or structural aspect is not mandatory or significant, and the mechanisms that implement the disclosure or its features may have different names, formats, or protocols. Also, the particular division of functionality between the various system components described herein is merely for purposes of example, and is not mandatory; functions performed by a single system component may instead be performed by multiple components, and functions performed by multiple components may instead performed by a single component.

Some portions of above description present the features of the present disclosure in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present disclosure include process steps and instructions described herein in the form of an algorithm. It should be noted that the process steps and instructions of the present disclosure could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of non-transient computer-readable storage medium suitable for storing electronic instructions. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein, and any references to specific languages are provided for disclosure of enablement and best mode of the present disclosure.

The present disclosure is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present disclosure is intended to be illustrative, but not limiting, of the scope of the disclosure, which is set forth in the following claims.

What is claimed is:

1. A computer-implemented method for identifying the value of bidding on an advertisement to be placed to a user, the method executed by a computer system, and comprising:
    maintaining, in a database by the computer system, a plurality of lift curves associated with a plurality of advertisers, wherein the lift curve for each advertiser identifies, relative to that advertiser's conversions, a sequence of behavior tuples, each behavior tuple in the sequence describing at least one behavior and associated with a lift reflecting a relative likelihood of conversion for the incremental population of persistent identifiers reached by each behavior tuple relative to a baseline excluding the population of persistent identifiers targeted by all prior behavior tuples in the sequence, the behavior tuples in the sequence ordered from greatest to least amount of associated lift;

maintaining, in the database by the computer system, for each advertiser, advertising flight information including an estimated value to the advertiser for a conversion and an average conversion rate for the advertiser;

receiving, by the computer system, a request for a placement of an advertisement from a user device, the request including a persistent identifier of the user device, and a context for the placement;

identifying, by the computer system, a set of behaviors associated with the persistent identifier of the user device;

selecting advertisers to bid on providing an advertisement to the user device in response to the context of the placement;

determining, by the computer system, the lift for each of the selected advertisers relative to the lift curve associated with the selected advertiser, wherein the lift is determined by identifying, in the sequence of behavior tuples in the lift curve for the selected advertiser, a single behavior tuple associated with the highest lift that corresponds to the behaviors associated with the persistent identifier;

determining, by the computer system, for each selected advertiser a placement value for the placement of an advertisement to the user device, using the advertiser's estimated value for a conversion, and the average conversion rate for the advertiser and only the lift associated with the identified single behavior tuple from the sequence of behavior tuples in that advertiser's lift curve;

determining, by the computer system, a bid for each selected advertiser using the placement value for the selected advertiser;

determining, by the computer system, an advertiser providing a highest bid;

selecting, by the computer system, an advertisement from the advertiser providing a highest bid;

obtaining from a database, the selected advertisement; and providing, by the computer system, the selected advertisement to the user device.

2. The computer-implemented method of claim 1, wherein the advertising flight information includes pacing information and a threshold lift, the method further comprising:

excluding from bidding an advertiser whose determined lift for the set of behaviors is below the threshold lift; and adjusting the threshold lift based at least in part on the pacing information.

3. The computer-implemented method of claim 2, wherein the pacing information is derived from an advertising budget and a timeframe.

4. The computer-implemented method of claim 2, wherein the threshold lift is adjusted based in part on a current spending rate relative to the pacing.

5. The computer-implemented method of claim 4, wherein the threshold lift is adjusted to include additional behavior tuples from the advertiser's lift curve when the current spending rate is below the pacing.

6. The computer-implemented method of claim 4, wherein the threshold lift is adjusted to include fewer behavior tuples from the advertiser's lift curve when the current spending rate is above the pacing.

7. The computer-implemented method of claim 1, wherein the selection of advertisers to bid is based on advertiser preferences.

8. The computer-implemented method of claim 1, wherein the persistent identifier is a cookie maintained by a browser of the user device.

9. The computer-implemented method of claim 8, wherein the behaviors of the user are stored in the cookie.

10. The computer-implemented method of claim 1, wherein the persistent identifier identifies a combination of user device and a browser on the user device requesting the placement of an advertisement.

11. The computer-implemented method of claim 1, wherein identifying the single behavior tuple associated with the highest lift for a selected advertiser comprises identifying the first behavior tuple in the behavioral lift curve of the advertiser corresponding to behaviors associated with the persistent identifier.

12. The computer-implemented method of claim 1, wherein the behaviors associated with the persistent identifier are determined based on referrer links associated with the persistent identifier that identify websites visited in association with the persistent identifier.

* * * * *